(12) United States Patent
Kaufman

(10) Patent No.: US 7,301,124 B2
(45) Date of Patent: Nov. 27, 2007

(54) SYSTEM AND METHOD FOR COORDINATING WIRE FEEDER MOTOR OPERATION

(75) Inventor: Charles L. Kaufman, Neenah, WI (US)

(73) Assignee: Illinois Tool Works Inc., Glenview, IL (US)

(*) Notice: Subject to any disclaimer, the term of this patent is extended or adjusted under 35 U.S.C. 154(b) by 352 days.

(21) Appl. No.: 10/905,924

(22) Filed: Jan. 26, 2005

(65) Prior Publication Data

US 2006/0163230 A1 Jul. 27, 2006

(51) Int. Cl.
*B23K 9/133* (2006.01)
(52) U.S. Cl. .................................. 219/137.71
(58) Field of Classification Search ............ 219/137.71, 219/137.7, 137.2; 226/108
See application file for complete search history.

(56) References Cited

U.S. PATENT DOCUMENTS 3,293,477 A * 12/1966 Lobosco .................. 219/137.7
3,586,222 A * 6/1971 Rosen .................... 219/137.71

FOREIGN PATENT DOCUMENTS

| JP | 58-53376 A | * | 3/1983 |
| JP | 2-255273 A | * | 10/1990 |
| JP | 10-272569 A | * | 10/1998 |

OTHER PUBLICATIONS

Machine-generated English translation of Japanese document No. JP10-272569A.*

* cited by examiner

*Primary Examiner*—Clifford C. Shaw
(74) *Attorney, Agent, or Firm*—Ziolkowski Patent Solutions Group, SC (57) ABSTRACT

The present invention is directed to an apparatus and method for coordinating wire feeder motor operation. A wire feeder system includes a push motor configured to push a welding wire at a desired speed to and a pull motor configured to pull the welding wire from the push motor and dispense the welding wire from the wire feeder system. The system also includes a controller configured to control the pull motor to pull the welding wire at a start speed greater than the desired speed during a startup period.

22 Claims, 5 Drawing Sheets

SYSTEM AND METHOD FOR COORDINATING WIRE FEEDER MOTOR OPERATION

BACKGROUND OF THE INVENTION

The present invention relates generally to welding-type systems and, more particularly, to a system and method for coordinating delivery of a welding-type consumable using a multi-motor wire feeder system.

Typical wire feeders have a driven roller assembly for driving the consumable metal wire from a feed spindle through a welding gun for introduction to a weld. The drive mechanism in these driven roller assemblies typically includes a direct current (DC) motor or combination of DC motors. In a multi-motor drive configuration, a first motor is configured to take wire from the feed spindle and "push" it toward the gun. This motor is typically referred to as a "push motor." Within this arrangement, a second motor is configured to "pull" the wire from the push motor and drive it to the weld. Accordingly, this motor is typically referred to as a "pull motor."

Performance demands on wire feeders and torches not only require accurate speed but also accurate acceleration, deceleration, and braking control. That is, the consumable wire must be accurately controlled during the welding process and accurately disengaged from the welding-type process upon termination of the process. Failure to accurately control delivery of the consumable wire can result in excessive spatter, build-up on the tip of the wire, and generally provide less desirable welds.

In a multi-motor configuration, such as the aforementioned push-pull configuration, the operation of two separate motors must be satisfactorily coordinated to deliver the consumable wire to the weld. To control the push-pull configuration in certain prior art systems, the push motor is typically configured for constant torque operation and the pull motor is typically configured for constant speed operation. This control scheme delivers the consumable wire to the weld but can result in binding, birds nesting, and/or bunching of the consumable wire before or between the push motor and the pull motor.

Figure 1:
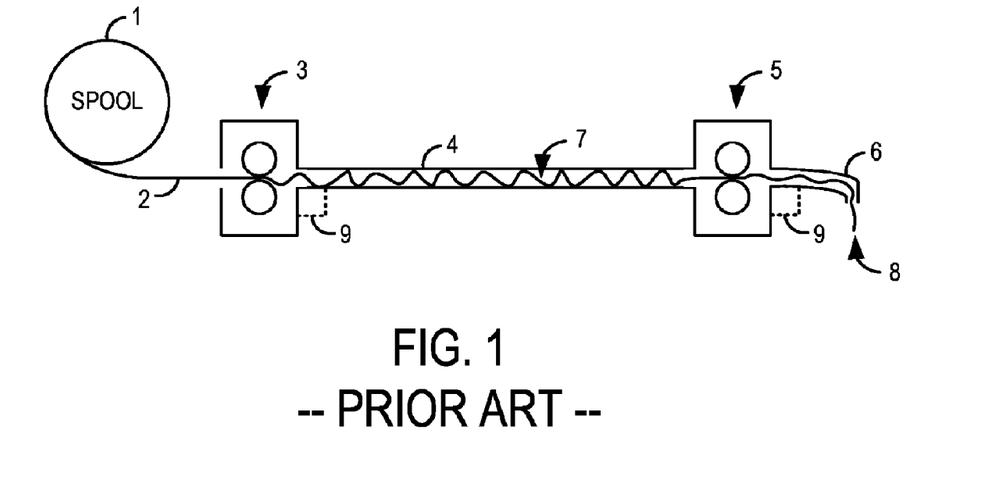
FIG. 1 is a schematic of a known wire feeder system.

For example, referring to FIG. 1, a known push-pull system is shown. A spool 1 is configured with a consumable wire 2 to be drawn by a push motor 3. The push motor 3 pushes the consumable wire 2 down a cable 4 to a pull motor 5. The pull motor 5 is constant speed controlled to pull the consumable wire 2 from the push motor 3 and deliver it to a torch tip 6. However, since the push motor 3 is configured for constant torque operation and the pull motor 5 is configured for speed operation, bunching, birds nesting, or binding 7 of the consumable wire 2 may occur within the cable 4 if the push motor 3 and pull motor 5 are even slightly unsynchronized. In particular, during startup or shutdown it is not uncommon for the push and pull motors to not be synchronized. In this case, the consumable wire 2 may become kinked or bent 8 when exiting the torch 6. These irregularities in the consumable wire 2 caused by bunching or binding 7 of the consumable wire 2 within the cable 5 can not only cause inaccurate welds but could also prevent welding all together. Additionally, imprecise wire feed is particularly troublesome in certain welding-type process, such as pulsed welding, where highly accurate control and delivery of the consumable wire 2 to the weld is required.

Many push-pull systems rely on fixed control schemes without feedback and, therefore, have no sensors, such as a tachometer, to monitor the wire 2. However, such fixed control schemes are "rigid" and are not readily adaptable to different torches that may include new or different pull motors. That is, the fixed control scheme is designed to accurately control specific push and pull motors. If the pull motor that the fixed control scheme is designed to control is removed, such as when replacing the gun 6, the fixed control scheme may not accurately control the new pull motor 5 associated with the new gun 6. Additionally, if a change is made in welding wire 2, such as gauge or type, the fixed control scheme may not be sufficiently flexible to maintain motor synchronization. Accordingly, separate fixed control schemes must be created for each combination of motors 3, 5, and wire, which is costly and time consuming.

Some systems include a tachometer 9 (shown in phantom) on the pull motor 5 to provide wire feed speed feedback at the pull motor 5 without regard to the push motor 3. In this case, the system is able to adapt control of the pull motor 5 based on feedback from the tachometer 9. However, since no feedback is received regarding the operation of the push motor 3, the push motor 3 may become unsynchronized with the pull motor 5, such as when changing welding wire 2 type or gauge, and cause bunching, birds nesting, or binding 7.

Yet other systems include tachometer sensors 9 (shown in phantom) on both the push and pull motors 3, 5 to keep the motors running at the same speed. While theses systems are able to adapt to changes in the motors, such as when switching guns 6 or welding wire 2, these systems require calibration to properly interpret the feedback from the tachometers 9 from the particular motors and synchronize the motor speeds. That is, these systems require re-synchronization whenever the gun 6 is changed and/or whenever there is a change in the type or size of wire 2.

Accordingly, it would be desirable to have a system and method for improved accuracy and control of welding-type consumable delivery that does not require regular re-synchronization/re-calibration. In particular, it would be desirable to have a technique to control the operation of a multi-motor wire feeder system to reduce bunching, binding, kinking, birds nesting, and/or bending of the consumable wire and provide a generally more accurate delivery of the consumable wire to the weld.

BRIEF DESCRIPTION OF THE INVENTION

The present invention is directed to a system and method for controlling a wire feeder that overcomes the aforementioned drawbacks. Specifically, the present invention includes a technique for controlling a multi-motor wire feeder system that promotes a taut condition of the consumable wire when traveling between the motors. As such, birds nesting, or bunching, binding, kinking, and/or bending of the consumable wire is reduced, which improves accuracy of the welding-type process.

Therefore, in accordance with one aspect of the present invention, a wire feeder system is disclosed that includes a push motor configured to push a welding wire at a desired speed and a pull motor configured to pull the welding wire from the push motor and dispense the welding wire from the wire feeder system. The system also includes a controller configured to control the pull motor to pull the welding wire at a start speed greater than the desired speed during a startup period.

In accordance with another aspect of the present invention, a welding-type apparatus is disclosed that includes a wire feed speed (WFS) selector configured to receive a desired WFS and a wire feeder having a push motor and a pull motor configured to drive delivery of a welding wire.

The apparatus also includes a motor controller configured to start the pull motor to deliver the welding wire at a pull speed above the desired WFS. The controller is also configured to start the push motor to deliver the welding wire at a push speed approximately matching the desired WFS and regulate the pull motor to reduce the pull speed to substantially match the push speed.

In accordance with yet another aspect of the present invention, a controller is disclosed that includes means for receiving a user-initiated start command and means for starting a first constant speed motor configured to pull a consumable at a pull speed above a speed set by the user-initiated start command. The controller also includes means for starting a second constant speed motor configured to push the consumable at a push speed substantially matching the speed set by the user-initiated start command and means for regulating the first constant speed motor to match the pull speed to the push speed upon expiration of an initialization period.

In accordance with another aspect of the present invention, a wire feeder system is disclosed that includes a push motor configured to push a welding wire at a desired speed and no more than one tachometer, the one tachometer associated with the push motor to monitor wire feed speed. The system also includes a pull motor configured to receive the welding wire from the push motor and deliver the welding wire to a weld.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention is directed to a system and method for coordinating operation of a multi-motor wire feeder system. Specifically, the present invention includes a technique for controlling the wire feeder motors to avoid kinks or bends in the consumable wire and increase accuracy in delivery of the consumable wire to a weld.

Description of a welding apparatus illustrates just one embodiment in which the present invention may be implemented. The present invention is equivalently applicable with many other systems that include movement and/or delivery of a consumable, such as manufacturing consumables. For example, the present invention may be utilized with manufacturing processes where a piece or portion of a manufacturing product or the product being manufactured is moved or delivered to and from manufacturing stations or a manufacturing process.

Figure 2:
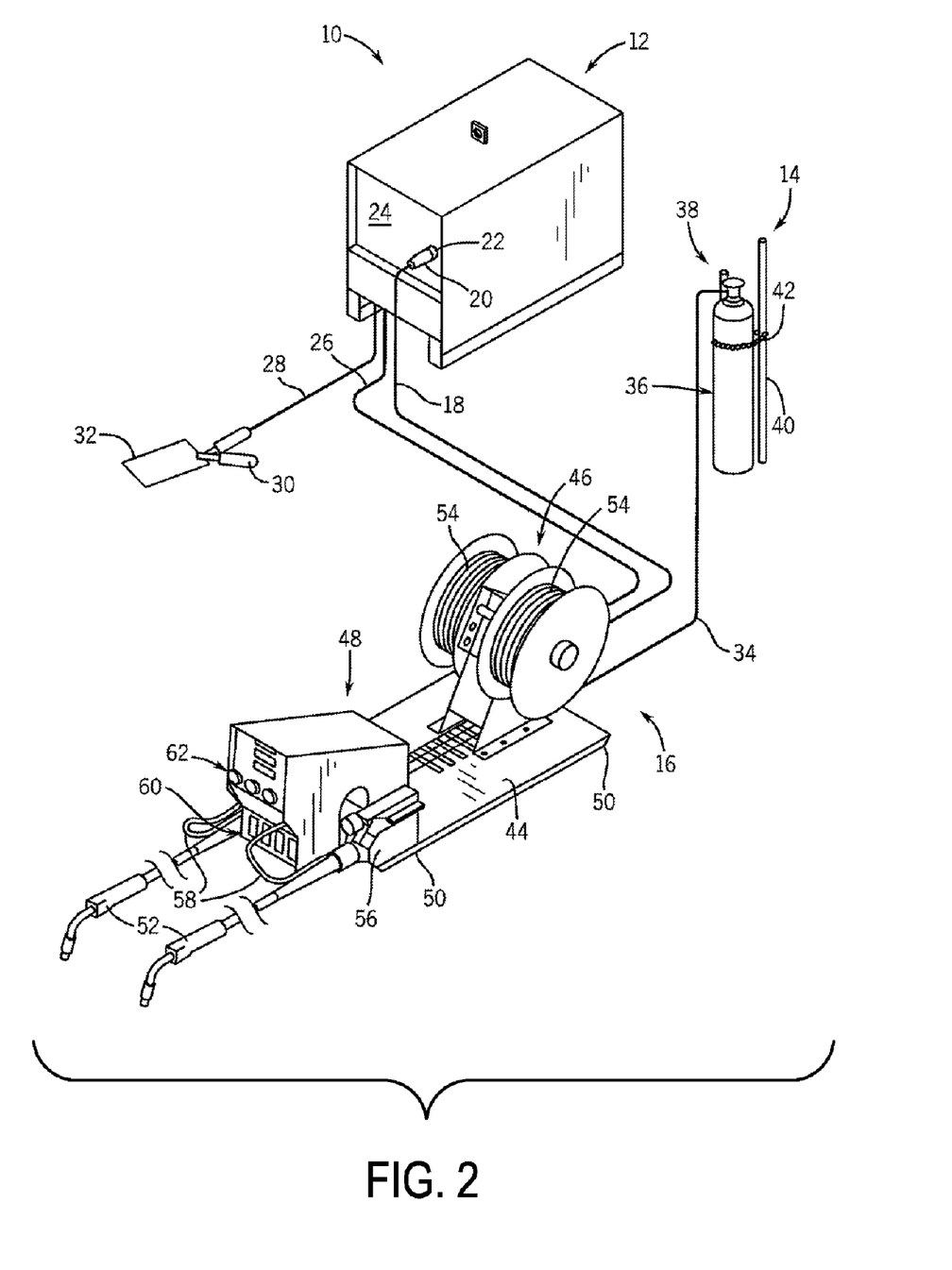
FIG. 2 is a perspective view of an assembled power source and wire feeder combination incorporating the present invention.

Referring now to FIG. 2, an exemplary welding system 10 is shown having a power source 12, a gas cylinder 14, and a wire feeder assembly 16. The wire feeder 16 is electrically connected to the power source 12 via a control cable 18 wherein the cable 18 includes a pin connector 20 that engages a corresponding receptacle 22 on the front panel 24 of the power source 12. Also connected between the power source 12 and the wire feeder 16 is a weld cable 26. The weld cable 26 may be either a positive weld cable or a negative weld cable depending upon the particular welding process. Hereinafter, however, the cable 26 will be described as a positive weld cable. As such, a negative or ground weld cable 28 also extends from the power source 12. The negative weld cable 28 extends from the power source 12 to a clamping member 30, which is configured to hold a workpiece 32.

A gas hose 34 is also connected to the wire feeder 16 to supply gas for an arc-welding process from a gas cylinder 36. The gas cylinder 36 includes a regulator and flow meter 38 and, in the embodiment illustrated in FIG. 2, is securely positioned against a structure 40 via a chain 42.

The wire feeder 16 includes a base plate 44 which is configured to support wire feed spindles 46 and a control box 48. It should be noted that on the undersurface of the base plate 44 are a number of rubber feet 50 that help to limit sliding of the wire feeder 16. In the illustrated embodiment, the wire feeder 16 includes two welding torches 52 which are supplied with a welding wire 54 stored on the wire feed spindles 46 by a corresponding drive roller assembly 56. Each drive assembly 56 is connected to the control box 48 via leads 58.

As will be described, the control box 48 controls the operation of each drive assembly 56 according to a control technique to avoid kinks or bends in the consumable wire and increased accuracy in delivery of the consumable wire to a weld. While the illustrated embodiment includes multiple torches 52, as will be described with respect to FIG. 3, the present invention is equally applicable with systems utilizing single torch configurations.

Control box 48 includes a number of controls 60 and switches 62 that are used by the welder or technician to conduct the welding process. The switches 60 and switches 62, for example, may include JOG/purge push buttons and an ON/OFF switch, wire speed controls, and a left/right switch selection.

Figure 3:
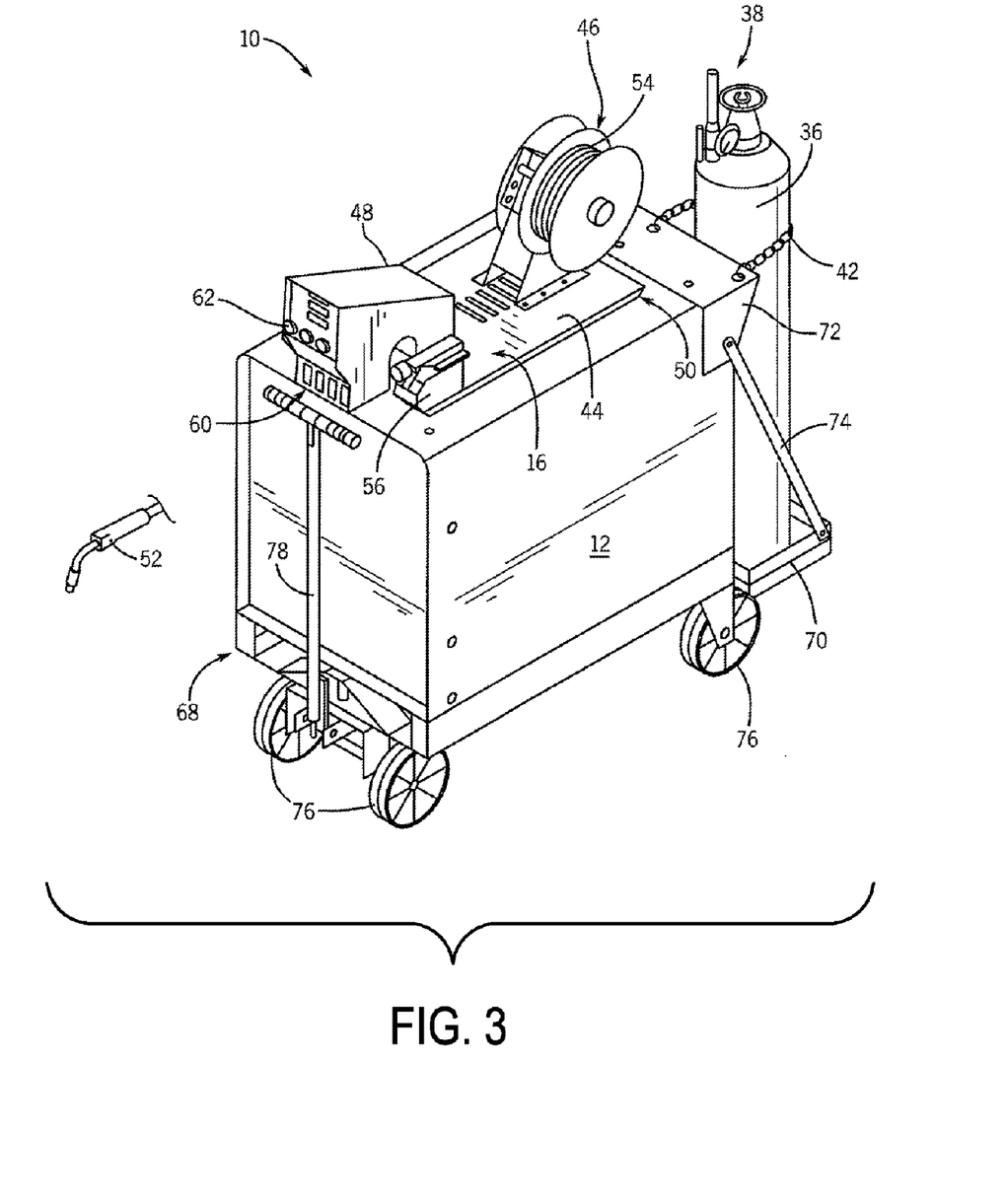
FIG. 3 is a perspective view of an assembled portable embodiment of that shown in FIG. 2.

Referring now to FIG. 3, the aforementioned welding apparatus may also be embodied in a portable system. That is, the wire feeder 16 may be positioned atop the power source 12 and be jointly placed on a pull cart 68. The previously described rubber feet 50 limit sliding movement of the wire feeder 16 when atop the power source 12. The pull cart 68 may also include a cylinder support tray 70 configured to support a gas cylinder 36. In this embodiment, a chain 42 is secured to a plate 72 that is connected to support the tray 70 via a cross-member 74. The plate 72 is designed to be secured to a portion of the power source 12. The pull cart 68 includes wheels 76 and a pulling arm 78 to assist with the transportability of the welding system.

Figure 4:
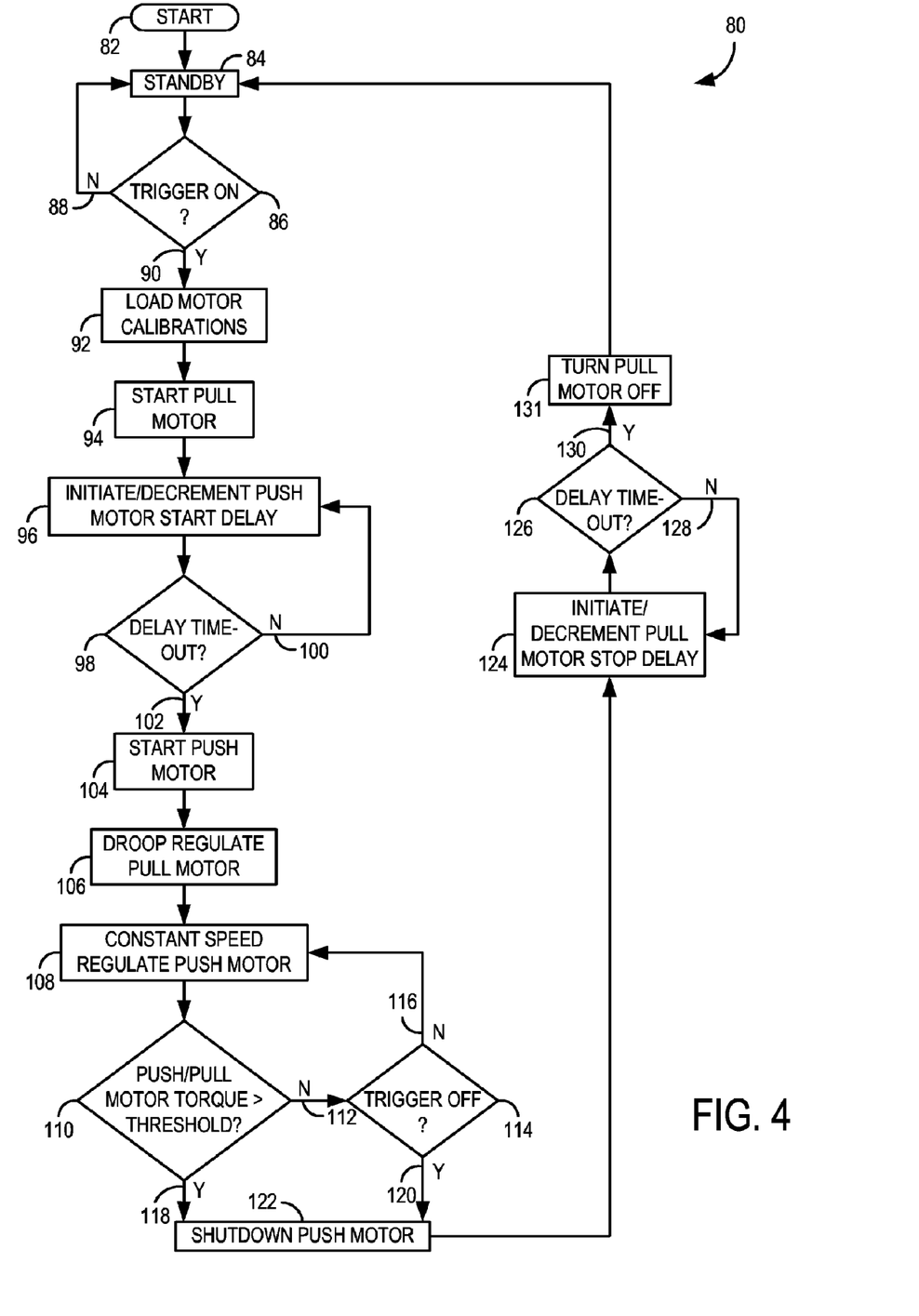
FIG. 4 is a flow chart setting forth the steps of a technique for controlling wire feeder motors shown in FIGS. 2-3 in accordance with one embodiment of the invention.

Referring now to FIG. 4, the steps of a control technique 80 are shown. As will be described, the control technique 80 allows operation of the push motor and pull motor to be synchronized without the need for control recalibrations when new or different torches incorporating new or different pull motors are combined with the push motor. That is, the control technique 80 allows the welding-type system to operate as a "plug-and-play" system whereby accurate consumable delivery is achieved regardless of the characteristics of the welding torch and pull motor engaged with the welding-type system.

The technique 80 starts 82 in a standby mode 84. In standby mode 84, the welding system and wire feeder are powered and awaiting commands from an operator. Specifically, a "trigger on" command is awaited 86. Therefore, if the trigger is determined to be off 88, the system remains in standby mode 84.

Once the trigger is "on" 90, the system loads a motor calibration profile 92 for controlling the push and pull motors of the wire feeder. Specifically, when the system receives feedback from the welding gun that the trigger is engaged 90, the system loads the torque threshold(s) for the push and/or pull motors. As will be described, the torque threshold(s) are utilized to determine an error condition at the push and/or pull motors. For example, the torque threshold(s) may be utilized to determine when debris or component wear is inhibiting welding wire delivery from the push and/or pull motor, which could lead to a feed error. Once the motor calibrations are loaded 92, the pull motor is started 94 at a start-up wire feed speed (WFS) that exceeds the desired WFS selected by the operator prior to initiating the welding-type process.

Substantially simultaneously with starting the pull motor 94, a start delay of the push motor is initiated 96. The system then checks to determine whether the start delay of the push motor has expired 98. If not 100, the system iteratively decrements the counter monitoring the push motor start delay 96.

Once the push motor start delay has expired 102, the push motor is started 104. As will be further described, the push motor is started 104 at the desired WFS. Therefore, the pull motor is operating in excess of the desired WFS and the push motor is operating at the desired WFS. This unmatched WFS causes the push and pull motors to pull against one another to a certain degree to promote a taut condition on the consumable wire. This tension is then slowly alleviated as the pull motor is droop regulated 106. Specifically, the pull motor is controlled to allow the start-up WFS to droop down to the desired WFS. It is contemplated that this droop regulation 106 may be triggered by the starting of the push motor 104 or may be triggered based on a torque limit. That is, it is contemplated that once a given torque is sensed at the pull motor, the speed is reduced to match that of the push motor.

Meanwhile, the push motor is constant speed controlled within a torque limit 108. As such, a check is made to determine whether the torque of the push motor is greater than a threshold 110. The threshold 110 is selected such that the some levels of increased torque placed upon the welding wire is tolerated but increased torque caused by debris and/or component wear that may lead feed errors or mis-feeds are detected. Specifically, if the torque on the welding wire is below the threshold 112, the system is operating normally. In this case, the system determines whether the trigger is still engaged 114. If so 116, the system continues to constant speed regulate the push motor 108 to effectuate the desired weld-type process.

However, if the torque threshold is exceeded 118, for example when debris or component wear inhibits welding wire delivery from the push motor, an error has occurred. Additionally, if the trigger is off 120, the operator has signaled that the welding-type process should end. In either case, the push motor is then shutdown 122 and a stop pull motor delay is initiated 124.

Additionally, it is contemplated that a pull motor torque threshold may be utilized. In this case, the pull motor torque threshold is checked to determine when debris or component wear may lead to feed errors or mis-feeds 110. If the torque threshold is surpassed 118, a condition has been detected at the pull motor that may lead to a feed error. Accordingly, the push motor is shutdown 122 and the stop pull motor delay is initiated 124.

Once initiated 124 by surpassing either the push motor torque threshold, or the pull motor torque threshold 118, or by disengaging the trigger 120, a check is made to determine whether the pull motor stop delay has expired 126. If the pull motor stop delay has not yet expired 128, the system iteratively decrements the pull motor stop delay 124 until delay has expired or "timed-out" 130. The pull motor is then turned off 131 and the system returns to the standby mode 84.

Figure 5:
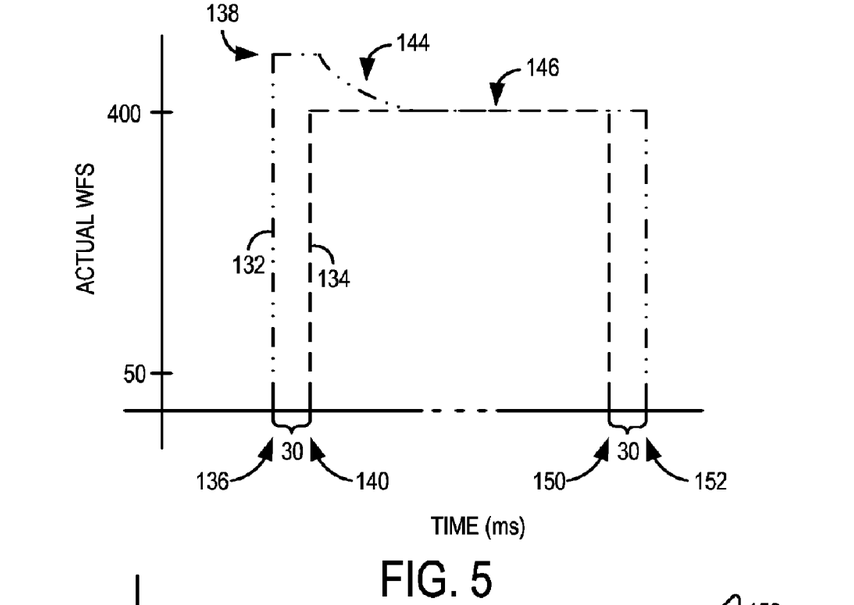
FIG. 5 is a graph illustrating the wire feed speeds of the wire feeder motors shown in FIGS. 2-3, as controlled in accordance with one embodiment of the invention.

Referring now to FIG. 5, the actual WFS of the push and pull motors is shown over time. In the graph, the actual WFS of the pull motor is shown as a dashed and dotted line 132 and the actual WFS of the push motor is shown as a dashed line 134. In the illustrated example, the desired WFS selected by the operator is 400 inches per minute (IPM). Accordingly, upon pulling the trigger 136, the pull motor is started at a start-up WFS 138 above the desired 400 IPM WFS. As previously described, when the pull motor starts, the system initiates a delay in the start of the push motor. In accordance with a preferred embodiment, the push motor start delay is approximately 30 milliseconds (ms). The pull motor continues operation at the start-up WFS 138 until the pull motor start delay expires and the push motor starts 140.

After the expiration of the push motor start delay 140, the push motor starts 140 at approximately the desired 400 IPM WFS 142. As previously stated, the push motor is controlled according to a constant speed control technique with a torque limit. That is, the push motor is controlled to maintain the desired 400 IPM WFS 142 within a torque limit even through the pull motor is pulling the wire at a speed in excess of the desired 400 IPM WFS 138. Therefore, the pull motor is pulling the wire faster than the push motor is pushing it to the pull motor creating a taut condition on the wire.

As the push motor is started 140, the pull motor is droop regulated to allow the pull motor WFS to droop 144 down to the desired 400 IPM WFS 138. Accordingly, though the initial start-up WFS of the pull motor is above the desired WFS 138, the pull motor WFS is controlled to droop 144 down to the desired WFS 138 to synchronize 146 the pull motor and push motor while maintaining a taut condition on the wire.

The synchronized operation 146 of the push and pull motors is continued until the trigger is released or, as described, a feed error is detected. Once the trigger is released or a feed error detected 150, the push motor is shut down. A pull motor shutdown delay is implemented substantially simultaneously with the shutdown of the push motor. In accordance with a preferred embodiment, the pull motor shutdown delay is approximately 30 ms. During the pull motor shutdown delay, the pull motor continues to pull the wire even though the push motor is disengaged. Accordingly, the taut condition of the wire is maintained during shutdown. Once the pull motor shutdown delay has expired 152, the pull motor is shutdown and the welding-type process ends.

Figure 6:
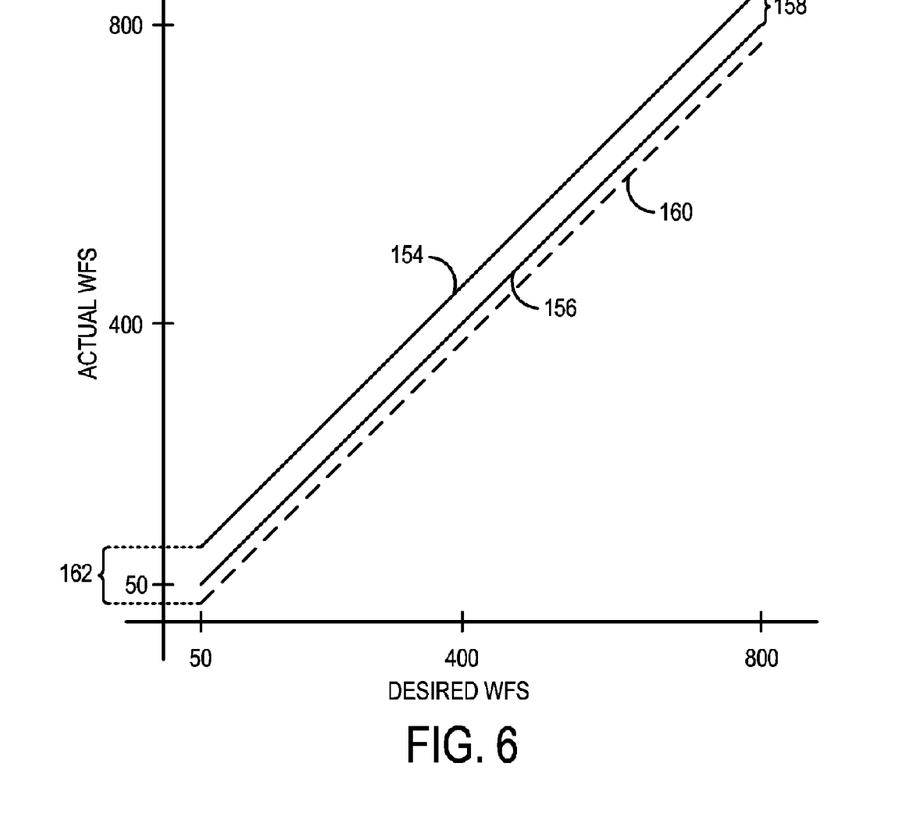
FIG. 6 is a graph of actual wire feed speed against desired wire feed speed in accordance with one embodiment of the invention.

Referring now to FIG. 6, a graph of actual WFS against desired WFS is shown. The graph shows the initial WFS of the pull motor 154 and the push motor 156. As shown, the actual WFS of the pull motor 154 is initially greater than the desired WFS. As such, upon start-up, the pull motor pulls the wire taut. When the push motor start delay expires, the pull motor WFS speed 154 is controlled to droop down a droop regulation band 158 to the pull motor WFS 156. Accordingly, the tension placed on the wire is slowly reduced as the pull motor speed 154 and the push motor speed 156 become synchronized.

Additionally, the torque placed on the motors is monitored to determine whether an error has occurred. For example, if the wire was mis-fed into the wire feeder, the wire might jam or become misaligned. In this case, the torque placed on the motors may increase and the actual WFS of the motors may decrease. Should an error occur, for example, the pull motor WFS 158 may decrease below an error threshold 160. That is, the actual WFS of the pull motor 154 may shift down a torque band 162 below a pull motor overload error threshold 160. If the actual WFS of the pull motor 154 shifts down the torque band 162 below the pull motor overload error threshold 160, an underspeed condition has been created at the pull motor. It is contemplated that this underspeed condition, which causes the overload error, may be attributable to component wear, debris, or general feedthrough errors. In any case, the overload/underspeed condition exists when the pull motor is being driven to substantially match the WFS of the push motor, however, due to some influence, such as dirt or debris, the motor is overloaded and unable to synchronize with the push motor to match the desired WFS. As previously stated, should such an event occur, the system recognizes an error and performs an automatic shutdown.

Figure 7:
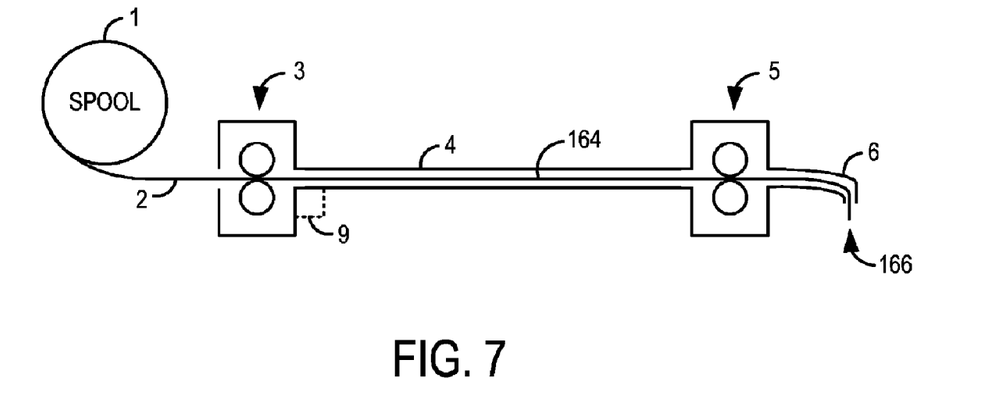
FIG. 7 is a schematic of a wire feeder system in accordance with one embodiment of the invention.

Referring now to FIG. 7, a wire feeder system operating according to the above-described control technique is shown. Specifically, the spool 1 is configured to have the consumable wire 2 delivered to the push motor 3. The push motor 3 pushes the consumable wire 2 down the cable 4 to the pull motor 5. Again, the pull motor is controlled to start prior to the push motor and shutdown after the push motor. The push motor 3 is constant speed controlled with a torque limit and the pull motor 5 is droop regulated to pull the consumable wire 2 from the push motor 3 and deliver it to the torch tip 6.

A single tachometer 9 is configured to monitor the speed of welding wire 2 leaving the push motor 3. By droop regulating the pull motor 5 to match the speed of the push motor 3, it is not necessary to include a tachometer to monitor wire speed at the pull motor 5. However, it is contemplated that the system will be compatible with torches 6 that include a tachometer and/or back electromotive force (EMF) feedback. However, such feedback is not required to properly operate the push-pull configuration to accurately deliver the consumable wire 2. That is, regardless of the particular pull motor 5, the speed of the pull motor 5 is synchronized with the speed of the push motor 3 by starting the pull motor 5 before the push motor 3 and then droop regulating the pull motor 5 to substantially match the speed of the push motor 3. This allows the system to adaptable to various pull motor 5 configurations without prior knowledge of the pull motor 5 configuration and without recalibration of the system to accommodate a new pull motor 5.

Accordingly, a "plug-and-play" wire feeder system is created that can adapt to virtually any torch 6 and pull motor 5 associated with the system to deliver the consumable wire 2 accurately without recalibration. The consumable wire 2 is maintained in a substantially taut condition 164 while traveling from the push motor 3 to the pull motor 5 regardless of the particular pull motor configuration 5. As such, the consumable wire 2 is delivered from the torch 6 in a smooth and even manner 166.

The above-described technique achieves accurate delivery of consumable wire to effectuate a desired welding-type process. Therefore, the technique is advantageously applicable with a wide variety of welding-type processes. For example, the technique is particularly advantageous with welding-type processes that require highly accurate delivery of the consumable wire, such as pulsed welding processes. However, it is contemplated that the present invention is equivalently applicable to a wide variety of welding-type processes and welding-type consumable delivery systems and may be utilized with respect to various aspects of welding-type devices.

The present invention has been described with particularity to a wire feeder of a welding system. However, the present invention is equivalently applicable to other machines and systems such as welders, plasma cutters, induction heaters, and the like. Reference to welding power, welding-type power, or welders generally, includes welding, cutting, or heating power.

Therefore, in accordance with one embodiment of the present invention, a wire feeder system includes a push motor configured to push a welding wire at a desired speed and a pull motor configured to pull the welding wire from the push motor and dispense the welding wire from the wire feeder system. The system also includes a controller configured to control the pull motor to pull the welding wire at a start speed greater than the desired speed during a startup period.

In accordance with another embodiment of the present invention, a welding-type apparatus includes a wire feed speed (WFS) selector configured to receive a desired WFS and a wire feeder having a push motor and a pull motor configured to drive delivery of a welding wire. The apparatus also includes a motor controller configured to start the pull motor to deliver the welding wire at a pull speed above the desired WFS. The controller is also configured to start the push motor to deliver the welding wire at a push speed approximately matching the desired WFS and regulate the pull motor to reduce the pull speed to substantially match the push speed.

Another embodiment of the present invention includes a controller. The controller includes means for receiving a user-initiated start command and means for starting a first constant speed motor configured to pull a consumable at a pull speed above a speed set by the user-initiated start command. The controller also includes means for starting a second constant speed motor configured to push the consumable at a push speed substantially matching the speed set by the user-initiated start command, and means for regulating the first constant speed motor to match the pull speed to the push speed upon expiration of an initialization period.

In accordance with yet another embodiment of the present invention, a wire feeder system includes a push motor configured to push a welding wire at a desired speed, and includes no more than one tachometer, the one tachometer associated with the push motor to monitor wire feed speed. The system also includes a pull motor configured to receive the welding wire from the push motor and deliver the welding wire to a weld.

The present invention has been described in terms of the preferred embodiment, and it is recognized that equivalents, alternatives, and modifications, aside from those expressly stated, are possible and within the scope of the appending claims.

What is claimed is:

1. A wire feeder system comprising:
   a push motor configured to push a welding wire at a desired speed;
   a pull motor configured to pull the welding wire from the push motor and dispense the welding wire from the wire feeder system; and
   a controller configured to control the pull motor to pull the welding wire at a start speed greater than the desired speed during a startup period, wherein the controller is further configured to confine the start speed within a torque band.

2. The system of claim 1 wherein the controller is further configured to delay startup of the push motor during the startup period to promote a taut condition of the welding wire.

3. The system of claim 1 wherein, after the startup period, the controller is further configured to control the push motor according to a constant speed mode with a torque limit and regulate the pull motor to maintain a taut condition on the welding wire when between the push motor and the pull motor.

4. The system of claim 3 wherein the controller is configured to droop regulate the pull motor based on at least one of a torque limit and a startup of the push motor to promote the taut condition.

5. The system of claim 1 wherein after the startup period the controller is further configured to receive input from a tachometer and monitor the wire feed speed at the push motor to control the push motor according to a desired, generally constant, speed mode with a torque limit and control the pull motor to speed match the push motor and the pull motor.

6. The system of claim 1 wherein the controller is further configured to droop regulate the pull motor over the startup period to bring the start speed toward the desired speed.

7. The system of claim 6 wherein the controller is further configured to control a welder to perform pulse welding.

8. The system of claim 1 wherein the torque band extends from approximately a stan speed threshold to an overload threshold and wherein the controller is further configured to indicate an error if the pull motor operates outside the torque band.

9. The system of claim 1 wherein the startup period lasts approximately 30 milliseconds (ms).

10. The system of claim 1 wherein the controller is further configured to shutdown the push motor upon detecting an overload condition of at least one of the pull motor and the push motor.

11. A welding-type apparatus comprising:
    a wire feed speed (WFS) selector configured to receive a desired WFS;
    a wire feeder having a push motor and a pull motor configured to drive delivery of a welding wire;
    a motor controller configured to:
       stan the pull motor to deliver the welding wire at a pull speed above the desired WFS;
       start the push motor to deliver the welding wire at a push speed approximately matching the desired WFS; and
       regulate the pull motor to reduce the pull speed to substantially match the push speed, and
    wherein the motor controller is further configured to stop the pull motor and the push motor if one of the push motor and the pull motor operates outside a torque band.

12. The apparatus of claim 11 wherein the motor controller is further configured to droop regulate the pull motor to establish and maintain a taut condition on the welding wire.

13. The apparatus of claim 11 wherein the torque band extends from approximately an stan speed threshold to an overload threshold and wherein the motor controller is further configured to indicate an error if the pull motor operates outside the torque band.

14. The apparatus of claim 13 wherein the motor controller is further configured to delay stopping the pull motor by approximately 30 ms to maintain a taut condition on the welding wire.

15. A controller comprising:
    means for receiving a user-initiated start command;
    means for starting a first constant speed motor configured to pull a consumable at a pull speed above a speed set by the user-initiated start command;
    means for starting a second constant speed motor configured to push the consumable at a push speed substantially matching the speed set by the user-initiated start command; and
    means for regulating the first constant speed motor to match the pull speed to the push speed upon expiration of an initialization period.

16. The controller of claim 15 configured to be incorporated into a welding system configured to perform a pulse welding process.

17. The controller of claim 16 wherein the welding wire is substantially constructed of aluminum.

18. A wire feeder system comprising:
    a push motor configured to push a welding wire at a desired speed;
    no more than one tachometer, the one tachometer associated with the push motor to monitor wire feed speed; and
    a pull motor configured to receive the welding wire from the push motor and deliver the welding wire to a weld.

19. A wire feeder system comprising:
    a push motor configured to push a welding wire at a desired speed;
    a pull motor configured to pull the welding wire from the push motor and dispense the welding wire from the wire feeder system;
    a controller configured to control the pull motor to pull the welding wire at a start speed greater than the desired speed during a startup period; and
    wherein, after the startup period, the controller is further configured to control the push motor according to a constant speed mode with a torque limit and regulate the pull motor to maintain a taut condition on the welding wire when between the push motor and the pull motor.

20. The system of claim 19 wherein the controller is configured to droop regulate the pull motor based on at least one of a torque limit and a startup of the push motor to promote the taut condition.

21. A wire feeder system comprising:
    a push motor configured to push a welding wire at a desired speed;
    a pull motor configured to pull the welding wire from the push motor and dispense the welding wire from the wire feeder system;

a controller configured to control the pull motor to pull the welding wire at a start speed greater than the desired speed during a startup period; and wherein the controller is further configured to shutdown the push motor upon detecting an overload condition of at least one of the pull motor and the push motor.

22. A welding-type apparatus comprising:

a wire feed speed (WFS) selector configured to receive a desired WFS;

a wire feeder having a push motor and a pull motor configured to drive delivery of a welding wire;

a motor controller programmed to:

instruct the pull motor to start delivering the welding wire at a pull speed above the desired WFS;

instruct the push motor to start delivering the welding wire at a push speed approximately matching the desired WFS; and thereafter instruct the pull motor to reduce the pull speed to substantially match the push speed.

* * * * *

UNITED STATES PATENT AND TRADEMARK OFFICE
CERTIFICATE OF CORRECTION

| | |
|---|---|
| PATENT NO. | : 7,301,124 B2 |
| APPLICATION NO. | : 10/905924 |
| DATED | : November 27, 2007 |
| INVENTOR(S) | : Charles Lyle Kaufman |

Page 1 of 1

It is certified that error appears in the above-identified patent and that said Letters Patent is hereby corrected as shown below:

Col. 9, line 44 (Claim 8), delete "stan" and substitute therefore -- start --;

Col. 9, line 61 (Claim 11), delete "stan" and substitute therefore -- start --;

Col. 10, line 9 (Claim 13), delete "stan" and substitute therefore -- start --.

Signed and Sealed this

Thirteenth Day of May, 2008

JON W. DUDAS
*Director of the United States Patent and Trademark Office*